US011567575B2

(12) United States Patent
Marks et al.

(10) Patent No.: US 11,567,575 B2
(45) Date of Patent: Jan. 31, 2023

(54) HAPTIC RESPONSE CONTROL

(71) Applicant: Microsoft Technology Licensing, LLC, Redmond, WA (US)

(72) Inventors: David A. Marks, Bellevue, WA (US); Robbie Edgar, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 17/346,871

(22) Filed: Jun. 14, 2021

(65) Prior Publication Data
US 2022/0397960 A1 Dec. 15, 2022

(51) Int. Cl.
*G06F 3/041* (2006.01)
*G06F 3/01* (2006.01)
*G06F 3/0354* (2013.01)

(52) U.S. Cl.
CPC .......... *G06F 3/016* (2013.01); *G06F 3/03547* (2013.01)

(58) Field of Classification Search
CPC ........ G06F 3/01; G06F 3/016; G06F 3/03547; G06F 3/0414; G06F 1/1616; G06F 1/1641; G06F 1/1652; G06F 1/1675; G09F 9/301
See application file for complete search history.

(56) References Cited

U.S. PATENT DOCUMENTS

| | | | |
|---|---|---|---|
| 8,937,603 B2* | 1/2015 | Flanagan | G06F 3/04886 345/173 |
| 9,182,864 B2 | 11/2015 | Mohindra et al. | |
| 9,448,631 B2 | 9/2016 | Ginn et al. | |
| 9,690,382 B1* | 6/2017 | Moussette | G06F 3/167 |
| 10,120,449 B2 | 11/2018 | Khoshkava et al. | |
| 10,401,962 B2 | 9/2019 | Rihn | |
| 10,416,799 B2* | 9/2019 | Picciotto | G06F 3/0488 |
| 10,437,333 B2 | 10/2019 | Bernstein et al. | |
| 10,496,172 B2* | 12/2019 | Bisbee | G06F 3/041 |
| 2010/0141407 A1* | 6/2010 | Heubel | H04B 5/0037 340/407.1 |

(Continued)

FOREIGN PATENT DOCUMENTS

| | | |
|---|---|---|
| EP | 2270627 A1 | 1/2011 |
| WO | 2014018115 A1 | 1/2014 |

OTHER PUBLICATIONS

"MAX11836—TacTouch™ Haptic Actuator and Touch-Pressure Measurement Controller with I²C Interface", Retrieved from: https://www.maximintegrated.com/en/products/all-products/archive/MAX11836.html, Jul. 20, 2010, 2 Pages.

(Continued)

*Primary Examiner* — Joe H Cheng
(74) *Attorney, Agent, or Firm* — Holzer Patel Drennan

(57) ABSTRACT

Haptic response is controlled in a device having a touch sensor, a force sensor, and a haptic response actuator operably coupled to a touch surface. A user touch to the touch surface is detected by the touch sensor. A force applied to the touch surface is sensed by the detected user touch. Electrical power supplied to the haptic response actuator is adjusted based at least in part on the sensed force satisfying a haptic condition. The haptic response to the touch surface is actuated based at least in part on satisfaction of the haptic condition and the supply of the adjusted electrical power to the haptic response actuator.

20 Claims, 6 Drawing Sheets

(56) References Cited

U.S. PATENT DOCUMENTS

| | | | |
|---|---|---|---|
| 2010/0156818 A1* | 6/2010 | Burrough | G06F 3/04883 345/173 |
| 2011/0018697 A1* | 1/2011 | Birnbaum | A63F 13/214 340/407.2 |
| 2011/0227872 A1 | 9/2011 | Huska et al. | |
| 2011/0260990 A1* | 10/2011 | Ali | G06F 3/016 345/173 |
| 2013/0332892 A1* | 12/2013 | Matsuki | G06F 3/04842 715/863 |
| 2015/0070152 A1* | 3/2015 | Rank | H04N 21/4131 340/407.1 |
| 2015/0084914 A1* | 3/2015 | Kuroki | G06F 3/016 345/174 |
| 2015/0227207 A1* | 8/2015 | Winter | G06F 3/03547 345/174 |
| 2016/0018894 A1* | 1/2016 | Yliaho | G06F 3/0433 345/177 |
| 2016/0062537 A1* | 3/2016 | Kim | G06F 3/016 345/174 |
| 2016/0195955 A1* | 7/2016 | Picciotto | G06F 3/04144 345/174 |
| 2016/0327986 A1 | 11/2016 | Farahani et al. | |
| 2016/0334912 A1* | 11/2016 | Protasio Ribeiro | G06F 3/0488 |
| 2016/0357297 A1* | 12/2016 | Picciotto | G06F 3/0488 |
| 2018/0348865 A1* | 12/2018 | Czelnik | B60K 37/06 |
| 2018/0364805 A1 | 12/2018 | El-ouardi et al. | |
| 2019/0187797 A1* | 6/2019 | Nakamura | G06F 3/016 |
| 2021/0250433 A1* | 8/2021 | Liu | H04M 1/0249 |

OTHER PUBLICATIONS

"International Search Report & Written Opinion issued in PCT Application No. PCT/US22/028958", dated Aug. 26, 2022, 12 Pages.

* cited by examiner

HAPTIC RESPONSE CONTROL

BACKGROUND

Computer users have grown accustomed to a physical sensation of a click when selecting something with a touchpad (e.g., a touch-sensitive trackpad). Modern systems rely on haptic response actuators to provide the physical sensation of a click when a user selection is made using a touchpad. Haptic feedback which may give the impression of a click may be activated when sufficient pressure is applied to a touchpad or trackpad.

SUMMARY

The described technology provides implementations of systems and methods for managing haptic response systems. More specifically, the described technology provides implementations of systems and methods for controlling a haptic response in a device having a touch sensor, a force sensor, and a haptic response actuator operably coupled to a touch surface, including detecting a user touch to the touch surface by the touch sensor, sensing a force applied to the touch surface by the detected user touch, adjusting electrical power supplied to the haptic response actuator based at least in part on the sensed force satisfying a haptic condition, and actuating the haptic response to the touch surface with the haptic response actuated based at least in part on satisfaction of the haptic condition by the sensed force and the supply of adjusted electrical power to the haptic response actuator.

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
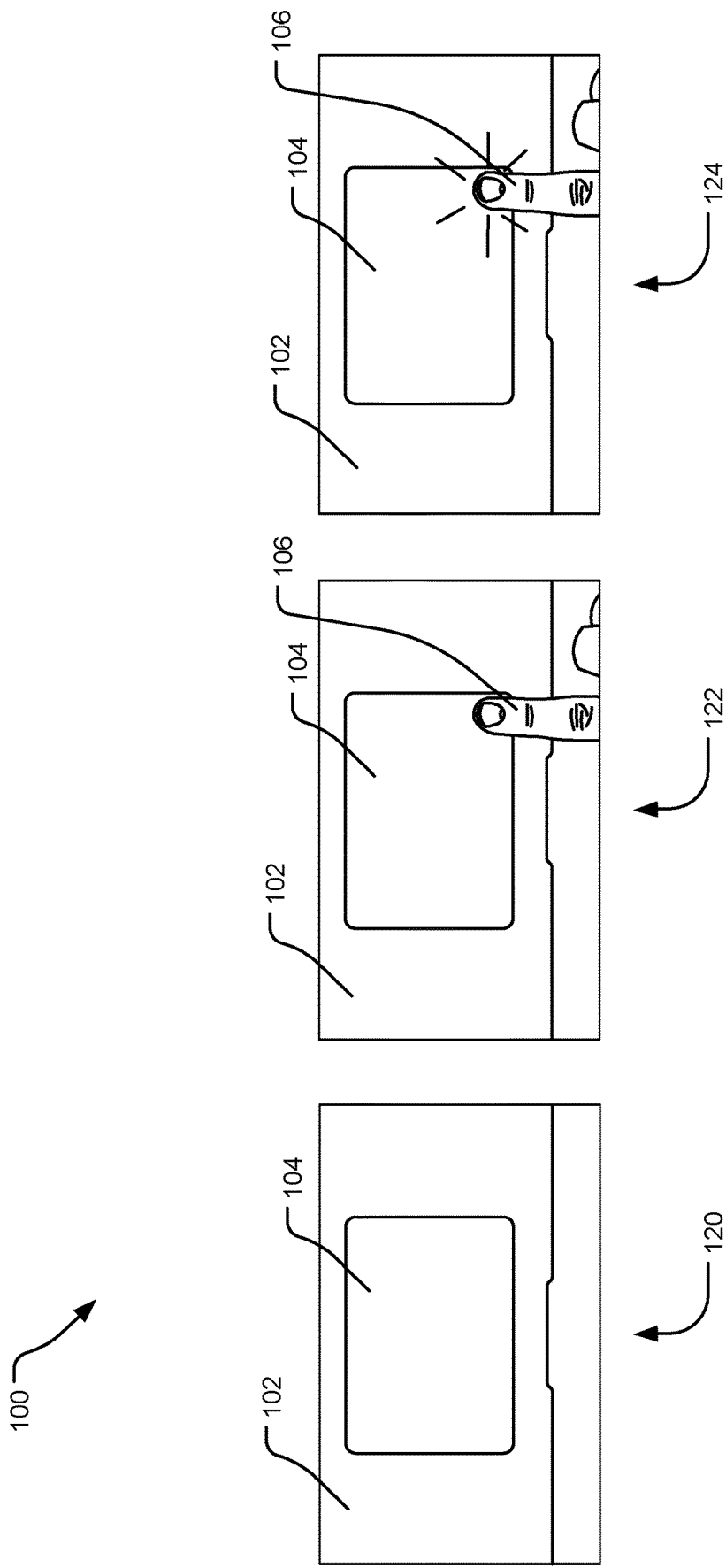
FIG. 1 illustrates example states of a system for controlling a haptic response.

Haptic response control systems can be complicated, often involving components and subcomponents from different vendors. Control of the haptic system components and communication between the central haptic control element and the operating system of a computing device that includes the haptic touchpad can be difficult and may require a precise and well-timed transfer of data between different components. Further, because of different protocols used, the translation and coordination may require a well-configured, centralized haptic circuit control module. The haptic circuit control module may translate and marshal data between components. The haptic circuit control module may also be responsible for all or any communications between a haptic system, such as a haptic board or circuit for processing force and touch sensor data and controlling haptic response in a computing device, and an operating system of the computing device with a touchpad. These communications may include user indications of selections and locations of touch on a touchpad of the computing device.

Haptic systems may include haptic force sensors and haptic response actuators, both of which are supplied with power to function correctly. However, unless the system is supposed to generate a haptic response, there may be no need for either of these elements to be supplied with sufficient power to activate a haptic response that may be perceived as a click. Portable computing devices often run on battery power, and reducing power consumption can be desirable. In one implementation, the haptic control system can supply minimal power or insufficient power to actuate a haptic response to haptic force sensors and/or haptic response actuators when there is no indication that a user has applied sufficient force to manifest a user indication and/or a haptic response. A user indication may be, for example, one or more of a selection, a request for a menu, and a highlighted area or text highlighting. In various implementations, the haptic circuit control module may be responsible for activating certain haptic components (e.g., a power booster or other haptic power supply to allow a haptic response actuator to actuate a haptic response).

In some implementations, a haptic touchpad system may erroneously and undesirably generate haptic responses at times when a user does not deliberately interact with the haptic touchpad (e.g., is not providing the touch force that should be interpreted as a user indication). A user may touch the touchpad (and therefore the touch sensor) that is not intended to be a user indication. For example, a person may be typing and incidentally touch the touchpad with a finger or palm. If using a touch sensor with no force sensor, the touchpad may detect a selection when a selection was not intended solely based on detecting a touch. Incorrect haptic responses may cause an uncomfortable or confounding sensation of a haptic response when not a user does not intend to cause a user indication. In one or more implementations of the described technology, a haptic response system evaluates that both a user touch indicating an active user touch state and a sufficient force indicating an active force sensor state are detected before activating a haptic response. This approach can limit incorrect user indication detections.

A magnitude or extent of a haptic response can be dynamically controlled. A haptic circuit control module may facilitate different haptic responses to different user-applied forces to a touchpad and to different user/system contexts. The haptic circuit control module may adjust power supplied to the haptic force sensor and haptic response actuator dynamically in response to a detection of a magnitude of user-applied force. For example, if a user applies sufficient force to press the surface of the touchpad to the fullest extent mechanically allowed, the haptic response actuated might be greater than a haptic response to a user-applied force that only just exceeds a minimum threshold for manifesting a user indication for which a haptic response is expected. Further, implementations are contemplated where a touch sensor or force sensor will indicate that a user has applied a touch or other user interaction of a different nature, for example, with more than one finger, such that a different haptic response may be expected to provide haptic feedback appropriate for the interaction of the different nature applied. Other natures of touches may be responsive to different user/system contexts. Implementations of natures of touches responsive to different user/system contexts include touches to an area or specific functional portion of the touchpad associated with particular functionality (e.g., right-click, left-click, scroll on scroll bar), touches that invoke special functions as a part of a workflow or process, program-specific touch interactions, touches specific to a user interface, and touches established using special system settings. The touch sensor or other haptic system component may analyze information regarding an extent or nature of a user interaction or force and can cause the haptic control system to yield a different haptic response and/or can modify haptic conditions used to determine when to trigger haptic responses based at least in part on the extent or nature of a user interaction or force. Because there may be a delay in activating haptic components that were in a sleep or inactive state, the haptic response force may initially be a default value that can be later modified after relevant haptic components are activated and extents of forces and/or natures of user interaction can be detected.

In an implementation where the haptic feedback is intended to express a click, the actuated force may be applied twice for a single clicking instance. For example, a first force may be felt when sufficient pressure is applied to touch sensor media to initiate a click, and a second force may be felt as the user touch force is removed. The second force may be applied by a haptic response actuator when a haptic release condition is met.

A touch sensor media system can withhold haptic responses under certain conditions. For example, the haptic response may require that certain components, such as a touch sensor and/or a force sensor, be in an active state in order to allow a system to trigger a haptic response. This may help prevent unwanted haptic responses. The haptic response may require that a haptic condition be satisfied. The haptic condition may include one or more triggering conditions of the system being in an active user touch state, the system being in an active force sensor state, the system receiving a nature of a touch that satisfies a condition, and the system receiving a magnitude of force that satisfies a condition. The triggering conditions can also be dependent upon one another. For example, a system may require that an active touch state and an active force state be triggered before any determination even considers triggering a haptic response. Another example is a user applying a touch with three fingers and the system requiring a greater amount of pressure be applied by the three fingers than for two fingers and requires that the system be in both an active touch state and an active force state before triggering a haptic response.

FIG. 1 illustrates example states 120, 122, and 124 of a system 100 for controlling a haptic response. Specifically, in the first system state 120, a user does not interact with touch sensor media 104. The touch sensor media 104 is a touch-sensitive element of the computing device 102. Because a user 106 is not touching the touch sensor media 104 in the first system state 120, the touch sensor media 104 maintains an inactive user touch state. When in an inactive user touch state, the touch sensor media 104 can prevent a haptic response and/or can decline to supply power to a haptic response actuator for actuating the haptic response. In the first system state 120, a force sensor of the touch sensor media 104 can be in an inactive force sensor state in which the force sensor one or more of is supplied or consumes less power, samples force measurements less frequently, and remains at a baseline level to preserve the accuracy of the force sensor.

In the second system state 122, the user 106 touches the touch sensor media 104 in a manner that a touch sensor of the touch sensor media 104 senses. In the second system state 122, the user touches the touch sensor media 104, but the touch does not apply sufficient force to satisfy a haptic condition representing a user indication for which user 106 might expect a haptic response (e.g., the touch does not express a click). The touch sensor of the touch sensor media can trigger an active touch state. The touch sensor can also activate a force sensor of the touch sensor media and trigger an active force sensor state. Despite the active states, a haptic response is not triggered because a user has not provided sufficient force to satisfy a force threshold of a haptic condition.

In one implementation, the touch sensor media 104 triggers a haptic response and/or supplies power to a haptic response actuator for actuating the haptic response based at least in part on detecting both an active user touch state and an active force sensor state, perhaps as elements of satisfaction of a haptic condition. In implementations, the touch sensor media can detect a nature of touch that can fail to satisfy a haptic condition, such that the touch is not interpreted as a user indication, and, even while a touch is detected, the nature of the touch or the circumstances of the touch are such that an active user touch state is not triggered in the touch sensor media 104. For example, incidental touching of a touchpad while typing on a keyboard may be ignored. Touches of other natures can satisfy haptic conditions, perhaps based on different conditions in the operating system.

In the third system state 124, the user 106 has applied sufficient force to the touch sensor media 104 to satisfy a force threshold of a haptic condition. The touch sensor media 104 being in an active user touch state and an active force sensor state and the force being sufficient to satisfy a force threshold of a haptic condition may satisfy a haptic condition, such that the touch sensor media 104 can interpret the user interaction as a user indication for which a user 106 expects a haptic response. In the third system state, because a signal representing a touch applied by the user satisfies a haptic condition, a touch sensor of the touch sensor media 104 triggers a haptic response. In an implementation where the touch sensor media 104 requires an active user touch state, an active force sensor state, and satisfaction of a haptic condition associated with one or more of a nature of and magnitude of force applied by a touch to satisfy a haptic condition, less power may be wasted by eliminating the power supplied for haptic response and/or force sensing when they are not needed. This implementation can also potentially reduce the likelihood of errant forces or touches causing erroneous user indications.

The haptic response, illustrated as lines around the user's 106 finger, can be an actuated haptic response that may be a vibration and/or other force applied to the user from the touch sensor media 104. In implementations where the haptic response manifests as a click, the expressed click may have a first haptic response when sufficient force is applied to indicate a user indication and a second haptic response when sufficient force is released. The haptic response may be triggered in response to a satisfaction of a haptic condition. In an implementation where the haptic response expresses a click, haptic conditions may include an indication condition and a release condition. For example, in implementations where the haptic response manifests as a click, a first haptic response may be triggered when sufficient force is applied to satisfy an indication condition, and a second haptic response may be triggered when a sufficient amount of force has been withdrawn or released to satisfy a potentially different release condition. In an implementation, the indication condition and release condition may be reverses of one another or may be different. For example, an indication condition can be satisfied by increasing a force applied beyond a user touch force threshold, and a release condition can be satisfied by releasing such that the applied force falls below the same or a different force threshold. For this specification, the term, haptic condition, may be used to express one or more of an indication condition and a release condition, even though the indication condition and the release condition may differ in magnitude and/or nature within the touch sensor media 104. Haptic conditions are also contemplated for activities other than clicking.

The touch sensor media 104 may control a magnitude of a haptic response by controlling the power supplied to a haptic response actuator. The magnitude of power supplied and/or haptic response provided can be based at least in part on a magnitude of force applied and/or a nature of a user interaction determined by the touch sensor media 104. The nature of the user interaction can be, for example, the parts of or a pattern of a user 106 that touch a touch surface or a number of fingers touching the touch surface. Other implementations of natures of touches include touches to an area or specific functional portion of the touchpad associated with particular functionality (e.g., right-click, left-click, scroll on scroll bar), touches that invoke special functions as a part of a workflow or process, program-specific touch interactions, touches specific to a user interface, and touches established using special system settings. Any nature of touch can be incorporated as an element of a haptic condition. The touch sensor media 104 may also be able to determine, based at least in part on the detected force applied and/or nature of user interaction whether a user touch expresses a user indication or is merely incidental touching. The user indication may be, for example, one or more of a selection, a request for a menu, and a highlighted area or text highlighting. Incidental touching may be, for example, incidentally touching a touch surface when typing. The touch sensor media 104 may make this determination independently or may do so with input from the computing device 102.

The touch sensor media 104 may be operable to receive user interaction data from a plurality of sensors in the touch sensor media 104. The touch sensor media 104 may include, for example, one or more of the touchpad, a haptic circuit control module, a force sensor, a touch sensor, a haptic response actuator, and a haptic power source.

Implementations are also contemplated in which haptic responses are generated in response to commands from an operating system of the computing system, perhaps based on satisfaction of different haptic conditions. For example, interactions with elements of the user interface may cause a haptic response (e.g., pointer proximity to buttons or window edges, application menus). Another example may be actuating a haptic response when disconnecting or connecting to a power source. The haptic responses may also be made in tandem with audio prompts. A touch sensor of the touch sensor media 104 may be responsible for controlling aspects of the haptic responses. For example, the touch sensor may be responsible for determining when a haptic response is triggered, when active user touch states are triggered, when active force states are triggered, when different conditions and/or thresholds should be applied, extents and/or natures of haptic responses, dynamic thresholds for different natures of touch or situations, special thresholding or conditions for haptic responses from prompts from the operating system.

Figure 2:
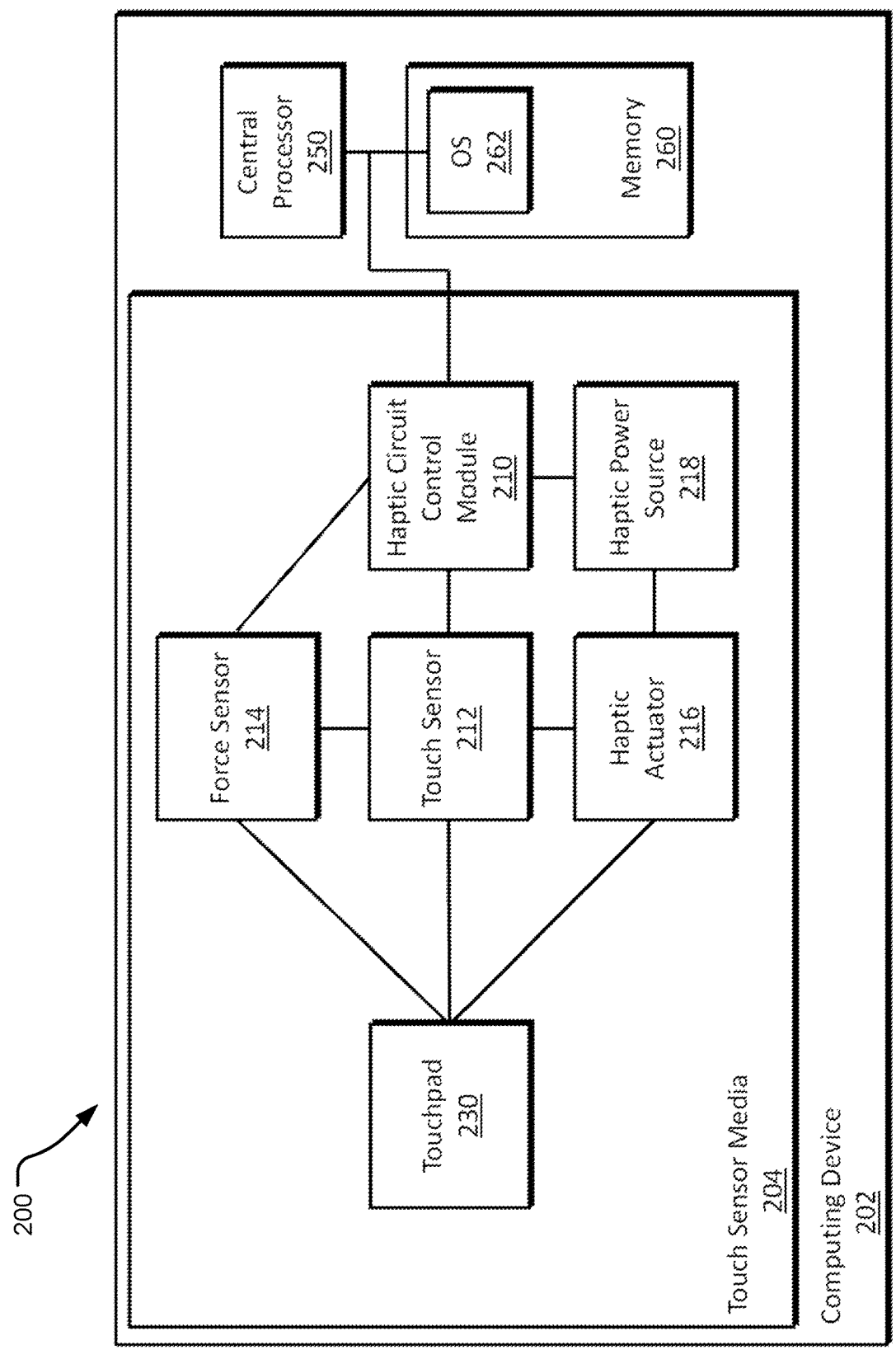
FIG. 2 illustrates an example of a system for controlling a haptic response.

FIG. 2 illustrates an example of a system 200 for controlling a haptic response. The system 200 includes a computing device 202 with touch sensor media 204. The computing device 202 includes a central processor 250 and a memory device 260 with a stored operating system 262. The computing device 202 may be an implementation of computing device 600. The touch sensor media 204 includes a touchpad 230. The touchpad 230 is a device for receiving user interaction with the touch sensor media 204. The touchpad 230 may include a surface with which a user can interact. The surface may transmit the interaction through to sensors, for example, one or more of a touch sensor 212 and a force sensor 214. The surface may also interact with a haptic response actuator 216 to receive haptic responses and translate the haptic responses to a user, perhaps in a manner perceived by the user as a click. The responses may be one or more of a vibration and a force applied from the computing device 202 to the user.

The haptic circuit control module 210 is a central controller of the touch sensor media 204. The haptic circuit control module 210 may be a central communication hub for other components of the touch sensor media 204 and may facilitate communications between the touch sensor media 204 and the computing device 202 of which the touch sensor media 204 is a component or to which the touch sensor media 204 is otherwise communicatively coupled. The haptic circuit control module 210 may be communicatively coupled to one or more of the touch sensor 212, the force sensor 214, the haptic response actuator 216, the haptic power source 218, and other elements of the computing device 202 perhaps including the operating system 262. The haptic circuit control module 210 may also be responsible for activating and/or adjusting a haptic power source 218 when a haptic condition is satisfied. The haptic circuit control module 210 may have a power adjuster module to consult predefined or dynamic power adjustment data (e.g., data tables that relate power adjustments or activations to haptic condition satisfaction). Satisfaction of a haptic condition may include determining whether an applied force exceeds a predefined and/or dynamic haptic force threshold.

In implementations, the haptic circuit control module 210 may further be responsible for determining or transmitting an extent of haptic power supplied to a haptic response actuator, perhaps by controlling the haptic power source 218. This may control an extent of force applied in a haptic response (e.g., during pressing and/or releasing). The haptic circuit control module 210 may be responsible for one or more of receiving interrupts and/or touch reports from the touch sensor 212; transmitting requests for and/or receiving force sensor reports from a force sensor 214; transmitting force sensor reports to the touch sensor 212; receiving signals representing instructions from the touch sensor 212 to activate, adjust, or deactivate the haptic power source 218; activating, deactivating, or adjusting the haptic power source 218; and communicating relevant touch sensor media data (e.g., whether a user indication occurs, other touch and/or force sensor data, touch and/or force sensor reports, or other data relevant to the computing device 202 operations) to an operating system or other element of the computing device 202.

The touch sensor 212 is an element that detects a user touch of the touch sensor media 204 and may include a dedicated touch sensor processor for processing user touches of the touch sensor media 204. The touch sensor 212 may include a capacitive or other touch sensor.

The touch sensor 212 may be operable to determine and/or maintain user touch states. For example, if the touch sensor 212 detects a user touch, the touch sensor 212 may initiate or maintain an active user touch state, and if the touch sensor 212 does not detect a user touch, the touch sensor 212 may initiate or maintain an inactive user touch state. The determination of whether the touch sensor 212 triggers an active user touch state may be based at least in part on a satisfaction of a touch state condition. In implementations, the touch sensor 212 may trigger an active touch state upon any touch interaction with the touch sensor 212 or a specific touch state condition may include determining the nature of the touch and the circumstances of the touch. The touch sensor 212 may also control dynamic thresholding and/or dynamic satisfaction conditions for one or more of user touch states, force sensor states, and indication conditions. For example, when the haptic response considered is a click, the touch sensor 212 may vary a force threshold of a haptic condition depending on the number of fingers the touch sensor 212 detects touching the touch sensor media 204. Other examples include preventing triggering of an active force state and/or active user touch state when the touch is determined by the touch sensor 212 to be incidental, changing the threshold based at least in part on the position of the touch on the touchpad (e.g., near a scroller or a button portion of the touch sensor media 204), preventing a haptic response during a drag operation after a first click has been initiated, changing a haptic condition (e.g., a force threshold) during a drag and drop operation, changing conditions under which triggering of active force sensor states or active user touch states occurs based at least in part on instructions from the operating system 262 (e.g., in response to a position of a cursor on or action in a user interface), and changing any trigger or indication condition based at least in part on a time-based assessment of the touch (e.g., a velocity of motion of the touch).

The touch sensor 212 may be communicatively coupled to one or more of the haptic circuit control module 210, the force sensor 214, and the haptic response actuator 216. In implementations, the touch sensor 212 may be operable to control processes in the touch sensor media 204. For example, the touch sensor 212 may be responsible for one or more of monitoring the force sensor 214 to determine whether to activate the force sensor 214, transmitting signals representing a touch to the haptic circuit control module 210, transmitting interrupts and/or touch reports indicating relevant touch and force related events to the haptic circuit control module 210, transmitting requests for force data from the haptic circuit control module 210 of the force sensor 214, receiving force sensor data from the force sensor 214 or the haptic circuit control module 210, transmitting signals representing instructions to a haptic circuit control module 210 to activate and/or adjust haptic power supplied by a haptic power source 218, and transmitting signals representing instructions to actuate a haptic response to a haptic response actuator 216.

In an implementation, the touch sensor 212 may receive a touch from a user that satisfies a user touch condition to trigger an active touch state and transmits an instruction directly to the force sensor 214 to activate the force sensor 214. This request may be in response to the touch sensor 212 detecting a user touch indicating an active user touch state and/or can be a periodic notification. In implementations, even if data regarding sensed touch states and active and inactive force sensor states are transmitted directly between the touch sensor 212 and the force sensor 214, the force data may still be communicated to the touch sensor 212 exclusively or primarily through the haptic circuit control module 210.

In implementations, the touch sensor 212 may detect a nature of a user interaction to contribute to determine whether a user touch condition is satisfied and/or whether an active user touch state should be triggered. For example, the touch sensor 212 may detect a number of fingers applied by the user to determine or be transmitted to the haptic circuit control module to determine an extent of power to be supplied to the haptic response actuator 216 and, hence to determine the magnitude of haptic response actuated.

One or more of the haptic circuit control module 210 and the touch sensor 212 may have a meaningful interaction distinction module to distinguish meaningful user interactions with the touch sensor media 204 from incidental touching of the touch sensor media 204. The incidental touching may include, for example, touching that occurs when the user is typing on the computing device 202 and incidentally touches the touch sensor media 204. The one or more of the haptic circuit control module 210 and the touch sensor 212 may independently make this distinction within the touch sensor media 204 or may do so in concert with systems in the computing device 202. Data from the force sensor 214 may also be used to make the distinction. In various implementations, one or more of the touch sensor 212 and the haptic circuit control module 210 may determine one or more of a magnitude of power to be supplied by the haptic power source 218 to the haptic response actuator 216 and may do so based at least in part on one or more of a nature of a sensed user interaction and a magnitude of force applied by the sensed touch. Further conditions or thresholds for determining a nature or magnitude of an actuated haptic response may be determined based at least in part on the nature of the touch detected and/or the force applied. In various implementations, one or more of the haptic circuit control module 210 and the touch sensor 212 may be able to distinguish between a touching that represents a user indication and one that does not. For example, a touch representing a user indication and for which an active user touch state should be triggered may be one that involves one or more fingers and not a palm. Users may be more likely to intend a user indication when fingers touch the touch sensor 212, so this may reduce erroneous indication detections.

The force sensor 214 includes a component that senses force applied by the user to the touch sensor media 204 and may include its own processor for processing data representing forces the user applies to the touch sensor media 204. The force sensor 214 may be one or more of a piezoelectric element, resistive element, and strain gauge. The force sensor 214 may be in an active state or an inactive state. In an active state, the force sensor 214 may receive more power and/or may sample force detections more frequently than in inactive states.

The force sensor 214 may store or have access to logs or other memory elements to record force sensor data samples, perhaps collected in force sensor reports. The frequency at which the force sensor 214 updates these reports may be consistent or may differ depending on whether the force sensor 214 is in an active or inactive state. The force sensor 214 may be communicatively coupled to one or more of the touch sensor 212 and the haptic circuit control module 210.

The force sensor 214 may periodically transmit force data reports to the haptic circuit control module 210 and/or may do so upon request.

The force sensor 214 may sample and/or catalog force data at a frequency different from which it transmits force sensor data or reports to the haptic circuit control module 210. The timing of a report request may not align well with the timing of a force sensor report update. For example, an analog to digital converter of the force sensor 214 may supply force data on a consistent or a dynamic schedule that does not necessarily coincide with timings of requests for force sensor data. In implementations, if the touch sensor 212 receives a touch from the user, the touch sensor 212 may transmit a request to the haptic circuit control module 210 to receive force data. The request may come in the form of an interrupt. The request may come at any time and may come multiple times in an interval where the force sensor 214 has not yet updated from a prior force sensor report. If the force sensor 214 has not updated the force sensor report, the haptic circuit control module 210 may return the same force sensor report from the prior request. Given sufficient inactive time and/or inactive user interaction, the force sensor 214 may be returned to an inactive state from an active state.

Implementations are contemplated in which one or more of the haptic circuit control module 210, the touch sensor 212, the force sensor 214, and the haptic response actuator 216 may initiate, generate, store, or maintain user touch states and/or force sensor states. Implementations are also contemplated in which the one or more of the haptic circuit control module 210, the touch sensor 212, the force sensor 214, and the haptic response actuator 216 distribute the control of data transfer, storage, instruction, updating, or other touch sensor media operations or configurations expressed in the implementations of this specification.

The haptic response actuator 216 actuates a haptic response and may include a dedicated haptic response actuator processor. The haptic response actuator 216 may be communicatively coupled to one or more of the touch sensor 212, the haptic circuit control module 210, and the haptic power source 218. In an implementation, the haptic response actuator 216 may receive activation signals from the touch sensor 212 to activate a haptic response. The haptic response actuator 216 may be activated (e.g., supplied actuation power) upon applying sufficient pressure to the touch sensor media as reflected in force data provided by the force sensor 214. The haptic response actuator 216 may actuate a second haptic response within the same clicking event upon sufficient pressure having been removed or upon a user releasing the touch sensor media 204. The haptic response actuator 216 may receive primary power or supplemental power from the haptic power source 218. Implementations are contemplated in which one or more of the haptic response actuator 216, the force sensor 214 the touch sensor 212, and the haptic circuit control module 210 independently or cooperatively determine a magnitude of haptic response, perhaps based at least in part on the magnitude of force of a user touch.

The haptic power source 218 provides power to the haptic response actuator 216. The haptic response actuator 216 may rely on the haptic power source 218 to provide sufficient power for a perceivable haptic response. In implementations, the haptic response actuator 216 may include a separate monitoring power source or power source shared with the computer system to keep the processor of the haptic response actuator 216 active to receive instructions. In implementations, the haptic power source 218 may be a dedicated haptic power source that may be activated, deactivated, and/or adjusted, perhaps exclusively, to provide the haptic response actuator 216 with power to actuate a haptic response. The haptic power source 218 may be a supplemental power source that may provide a power boost. The haptic power source 218 may also be adjustable to make haptic responses commensurate with pressure or force applied by a user. The output of the haptic power source 218 may also be adjustable based at least in part on the nature of the user interaction, for instance, a number of fingers used in a clicking action. The haptic power source 218 may need to be activated quickly to actuate a haptic response, such that a response from the force sensor 214 indicating an extent of an applied force may not be in time to allow the haptic power source 218 to provide a dynamic power supply response. In these instances, a default haptic response resulting from a default power output from the haptic power source 218 may be used. Having a default value for power supplied to a haptic response actuator and allowing the haptic response power to be subsequently adjustable commensurate with a nature or magnitude of a user interaction may allow for the touch sensor media to give an initial, default, timely haptic response and then a subsequent haptic response that is more commensurate with the force applied by the user.

Figure 3:
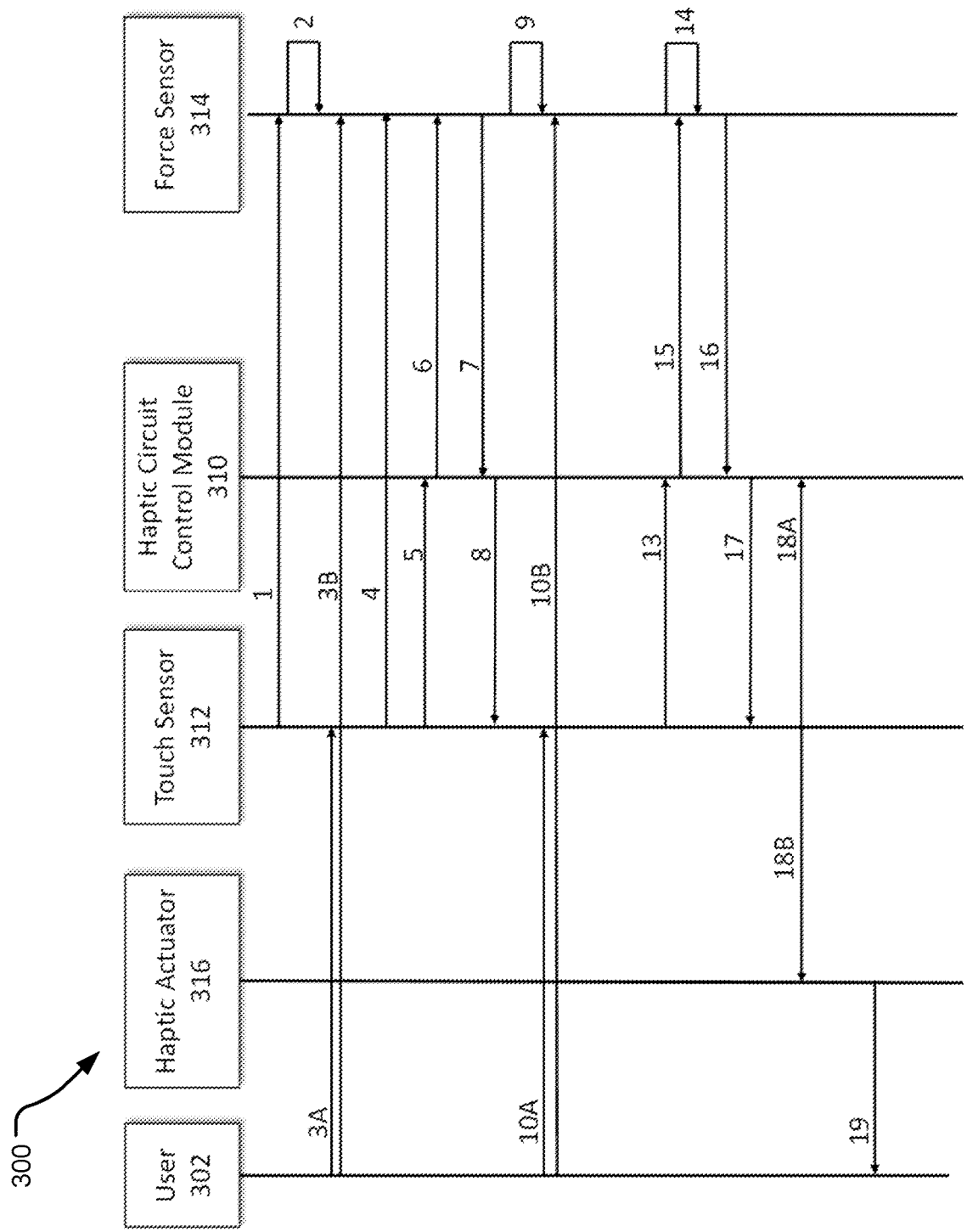
FIG. 3 illustrates an example of a data flow for a transition from a state of no user touching the touch sensor media to a state of initiating a user indication.
Figure 4:
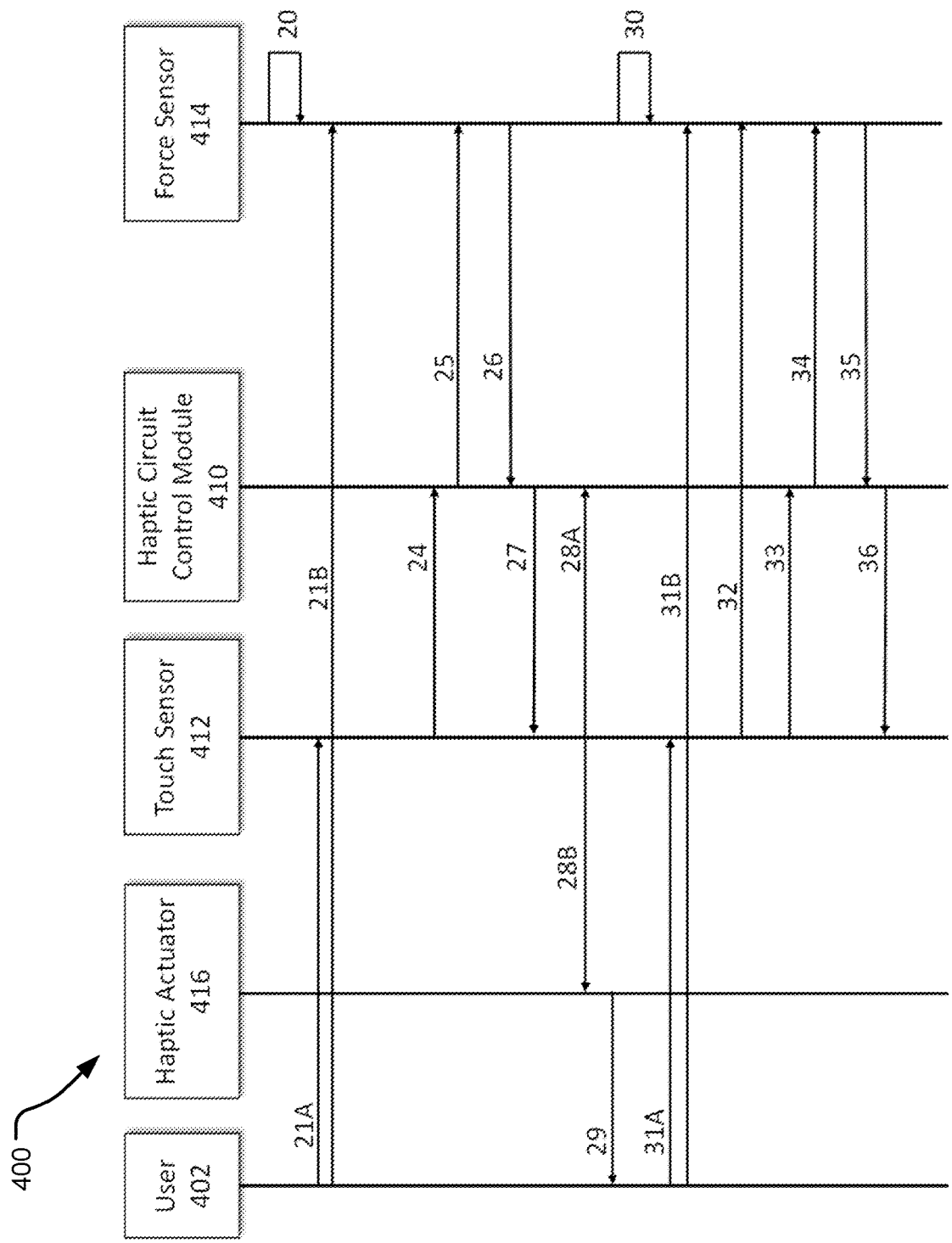
FIG. 4 illustrates an example of a data flow for a transition from a state of sufficient force applied to initiate a user indication to a state of no user touching the touch sensor media.

FIGS. 3 and 4 illustrate an example data flow 300, 400 for a haptic control system. Specifically, FIG. 3 illustrates an example of a data flow 300 for a transition from a state of no user touching the touch sensor media to a state of initiating a user indication. FIG. 3 begins in a state where no user is touching the touch sensor 312. Communication 1 from the touch sensor 312 to the force sensor 314 indicates to the force sensor 314 that a user 302 is not currently touching the touch sensor 312 or an inactive user touch state. In implementations, this inactive state may also be maintained if the touch is of a nature that does not trigger an active user touch state in the touch sensor 312. Update 2 is a force sensor update in which a force sensor report is updated based at least in part on recent force data determined by the force sensor 314. The force sensor report may include a list of recently sampled force measurements. At this point, the user is applying insufficient pressure to satisfy a haptic condition (e.g., an indication condition). Interactions 3A and 3B represent a user touch sensed by the touch sensor 312 and the force sensor. Because the touch sensor 312 senses a touch, the touch sensor 312 triggers an active touch state. The touch sensor transmits a notification in communication 4 to the force sensor 314 that a user is touching, and activates the force sensor, triggering an active force sensor state. An active force sensor state may cause the force sensor 314 to be supplied more power, and/or sample force readings more frequently. The touch sensor 312 transmits a request to the haptic circuit control module 310 for a most recent force sensor report in communication 5. Communication 5 or a separate communication also transmits a touch report to the haptic circuit control module 310 indicating the nature of the touch and/or that a touch state threshold has not been satisfied to represent a user indication. The haptic circuit control module 310 may further transmit touch reports received from the touch sensor 312 to an operating system of the computing device, perhaps to report user indications. The haptic circuit control module 310 responsively requests a force sensor report from the force sensor 314 in communication 6. The force sensor 314 responds by transmitting a force sensor report to the haptic circuit control module 310 in communication 7. The force sensor report or force data derived therefrom is sent from the haptic circuit control module 310 to the touch sensor 312 in communication 8. Despite being in both an active touch state and an active force sensor state, insufficient force has been applied to the force sensor 314 to satisfy a haptic condition. Because the haptic condition has not been met, the touch sensor 312 does not trigger a haptic response.

In update 9, the force sensor 314 updates its force sensor report determined in update 2. At this time, the user is applying sufficient pressure to satisfy a haptic condition (e.g., an indication condition). Interactions 10A and 10B represent the user continuing to apply a touch that is sensed by the touch sensor 312 and the force sensor 314. Because the touch sensor 312 still detects a touch, the touch state is still active, and because the force sensor 314 has not been instructed to deactivate, the force sensor 314 is still in an active force sensor state.

In communication 13, the touch sensor 312 requests that the haptic circuit control module 310 request a force report from the force sensor 314. This communication 13 or another communication may also provide a touch sensor report to the haptic circuit control module 310 to transmit the touch sensor report to an operating system. Update 14 happens at a potentially inconvenient time, as it begins after the request from communication 13 but the update is in progress when a request in communication 15 arrives for a force report. The force sensor 314 may present either the force sensor report from update 9, may wait for update 14 to finish, or the force sensor report may be a hybrid of information from prior update 9 and update 14. Force sensor 314 transmits whichever implementation of the force sensor report that is used to the haptic circuit control module 310 in communication 16. The force sensor report or force data derived therefrom is sent from the haptic circuit control module 310 to the touch sensor 312 in communication 17. Because the force applied as shown in the force report has exceeded a threshold of a haptic condition and because the active touch state and active force sensor state are maintained, the touch sensor determines that a haptic response should be generated. In response to this, the touch sensor 312 transmits instructions to the haptic circuit control module 310 to activate or otherwise adjust a haptic power source in communication 18A, and the touch sensor 312 transmits instructions to the haptic response actuator 316 in communication 18B to generate a haptic response. Communications 18A and 18B may occur substantially concurrently or closely in time. The haptic response actuator 316 may need to wait for the haptic power source to be activated before a haptic response may be triggered. Interaction 19 is a generated haptic response from the haptic response actuator 316, perhaps being actuated through a touchpad surface to the user 302. The user may feel this as a first haptic response of a click.

In implementations, one or more of the nature of haptic response, magnitude of haptic response, conditions for triggering active force sensor and user touch states, force thresholds, and haptic conditions may be determined dynamically by the touch sensor 312 based at least in part on a nature of user interaction or force magnitude of a user touch. If the power source has just been activated, there may be insufficient time to determine a dynamic haptic response magnitude. In this instance, a default power level may be supplied by the haptic power source to the haptic response actuator 316 to actuate a default haptic response until a dynamic haptic response and/or power level can be determined. At this point, the user has pressed sufficiently hard to initiate a click but has yet to release the pressure to satisfy a different haptic condition (e.g., a release condition).

FIG. 4 illustrates an example of a data flow 400 for a transition from a state of sufficient force applied to initiate a user indication to a state of no user touching the touch sensor media. In an implementation, the data flow 400 is a continuation of the data flow 300. Initially, the user begins to release pressure from the touch sensor media such that the force applied satisfies a haptic condition (e.g., a release condition or release threshold). Update 20 updates a force report to indicate that a user is applying less pressure, indicating that the force satisfies a haptic condition (e.g., is less than a release threshold). Interactions 21A and 21B represent a user 402 continuing to apply a touch that is sensed by the touch sensor 412 and the force sensor 414. Because the touch is still being applied, an active touch state and an active force sensor state are maintained. The touch sensor 412 then requests force data from the haptic circuit control module 410 in communication 24. This communication 24 or another communication may include a touch report to be communicated to an operating system, perhaps via the haptic circuit control module 310. The haptic circuit control module 410 responsively requests a force sensor report from the force sensor 414 in communication 25. The force sensor 414 transmits its most recent force sensor report from update 20 to the haptic circuit control module 410 in communication 26. The force sensor report or force data derived therefrom is sent from the haptic circuit control module 410 to the touch sensor 412 in communication 27. Because the release of force satisfies a release condition, and because both an active touch state and an active force sensor state are maintained, the touch sensor 412 determines that a haptic response should be generated. In response to this, the touch sensor 412 transmits instructions to the haptic circuit control module 410 to activate or otherwise adjust a haptic power source in communication 28A, and touch sensor 412 transmits instructions to the haptic response actuator 416 in communication 28B to generate a haptic response. Communication 28A and 28B may occur substantially concurrently or closely in time. The haptic response actuator 416 may need to wait for the haptic power source to be activated before a haptic response may be triggered. Interaction 29 is a generated haptic response by the haptic response actuator 416, perhaps being actuated through a touchpad surface to the user 402. The user may perceive this as a second part of a click.

The user 402 next ceases any touching of or interaction with the touch sensor media. Update 30 updates the force data in the force sensor 414. Interactions 31A and 31B represent that there is no touch detectable by either the touch sensor 412 or the force sensor 414. The touch sensor 412 responsively triggers an inactive touch state and transmits an instruction to deactivate the force sensor 414 in communication 32. This results in an inactive force sensor state. The touch sensor 412 continues a periodic request for updated force sensor data from the haptic circuit control module 410 in communication 33. In communication 34, the haptic circuit control module 410 requests a force sensor report from the force sensor 414 in communication 34. The force sensor 414 transmits the force sensor report most recently updated in update 30 to the haptic circuit control module 410 in communication 35. The force sensor report or force data derived therefrom is sent from the haptic circuit control module 410 to the touch sensor 412 in communication 36. No action is taken, as there is an inactive user touch state and an inactive force sensor state, and haptic conditions are configured to not be assessed or satisfied when in either of an inactive touch state or an inactive force state.

Although not illustrated, the touch sensor 412 may periodically provide touch sensor reports to the haptic circuit control module 410. These reports can be interpreted by the haptic circuit control module 410 and transmitted to elements of the computing device and/or can be transmitted directly from the haptic circuit control module 410 to elements of the computing device for the computing device to interpret. In implementations, the haptic circuit control module may transmit any data transmitted or generated in data flows 300 and 400 to the computer device systems for interpretation, or perhaps to merely inform elements of the computer system that a user indication and/or a haptic response has occurred.

Figure 5:
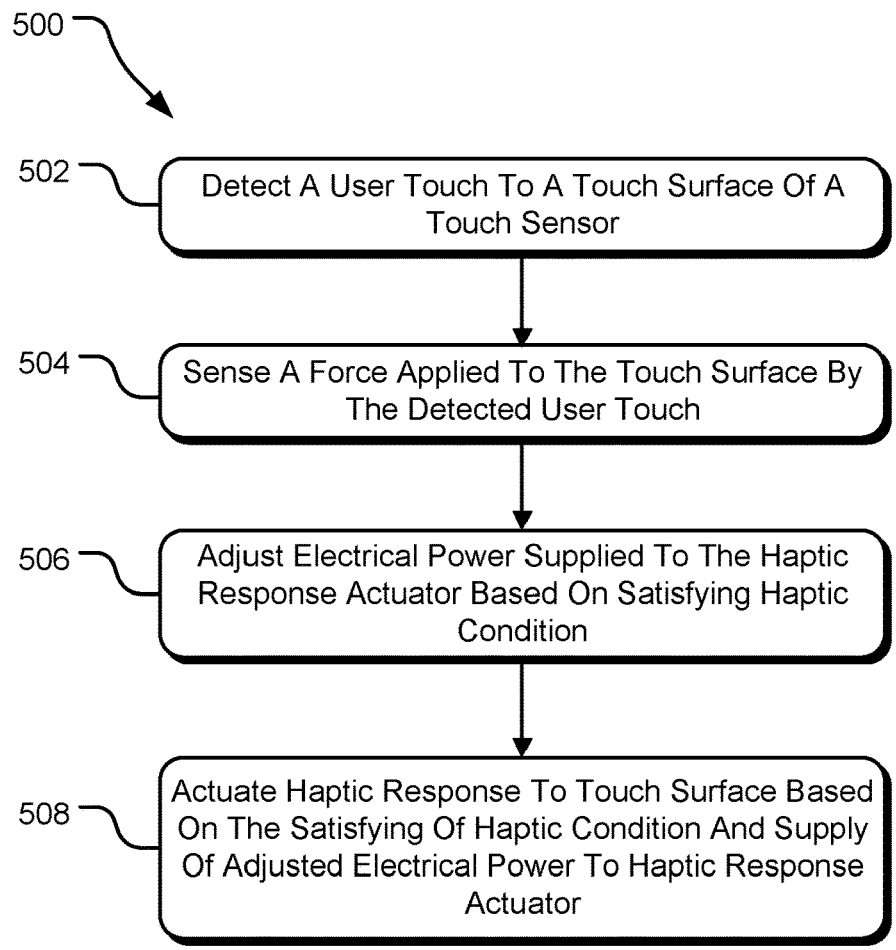
FIG. 5 illustrates an example operations of controlling a haptic response touch sensor media system.

FIG. 5 illustrates an example operations 500 of controlling a haptic response touch sensor media system. The haptic response touch sensor media system may include one or more of a haptic circuit control module, a touch sensor, a force sensor, and a haptic response actuator operably coupled to a touch surface. A detecting operation 502 detects a user touch to the touch surface by the touch sensor. The detecting operation 502 may use a touch sensor to determine and/or maintain user touch states. For example, if the touch sensor detects a user touch, the touch sensor or other element with which the touch sensor is in communication may initiate or maintain an active user touch state, and if the touch sensor does not detect a user touch, the touch sensor or other element with which the touch sensor is in communication may initiate or maintain an inactive user touch state. The touch sensor may also assess the nature of a touch or the circumstances surrounding the touch to determine whether to trigger an active user touch state. For example, the touch detected may be incidental and not indicative of a user indication for which a haptic response would be expected. Further, the touch sensor can dynamically adjust haptic conditions or have stored different haptic conditions based at least in part on one or more of the nature of the touch, the circumstances under which the touch occurred, and data from the force sensor.

In implementations, the touch sensor may be operable to control processes in the touch sensor media. For example, the touch sensor may be responsible for one or more of monitoring the force sensor to determine whether to activate the force sensor, transmitting signals representing a touch to the haptic circuit control module, transmitting interrupts and/or touch reports indicating relevant touch and force related events to the haptic circuit control module, receiving force sensor data from the force sensor or the haptic circuit control module, and determining whether to trigger a haptic response.

In implementations, the touch sensor may detect a nature of a user interaction to contribute to a determination of an extent of haptic response. For example, the touch sensor may detect a number of fingers applied by the user to the touch sensor media to determine or be transmitted to the haptic circuit control module to determine an extent of power to be supplied to the haptic response actuator and, hence to determine the magnitude of haptic response actuated. The touch sensor may also interpret that if more fingers are applied, different thresholding or conditioning should be applied to circumstances under which a haptic response, a user touch state, or a force sensor state should be triggered. One or more of the haptic circuit control module and the touch sensor may distinguish meaningful user interactions with the touch sensor media from incidental touching of the touch sensor media. The incidental touching may include, for example touching that occurs when the user is typing on the computing device and incidentally touches the touch sensor media. The one or more of the haptic circuit control module and the touch sensor may independently make this distinction within the touch sensor media or may do so in concert with systems in the computing device. Data from the force sensor may also be used to make the distinction. In implementations, one or more of the haptic circuit control module and the touch sensor may be able to distinguish between a touching that represents a user indication and one that does not. For example, a touch representing a user indication and for which an active user touch state should be triggered may be one that involves one or more fingers and not a palm. Users may be more likely to intend a user indication when fingers touch the touch sensor, so a finger touch detection is more likely to be accepted as a valid user indication.

A sensing operation 504 senses a force applied to the touch surface by the detected user touch. In an implementation, the touch sensor may receive a touch from a user and transmit an instruction to the force sensor to activate the force sensor. In implementations, both an active user touch state and an active force sensor state are detected may be prerequisites to satisfying a haptic condition (e.g., an indication condition or release condition). The instruction from the touch sensor to the force sensor to activate the force sensor can be an interrupt response to the touch sensor detecting a user touch indicating an active user touch state and/or can be made at periodic intervals when a touch is detected. In implementations, even if data regarding sensed touch states and active and inactive force sensor states are transmitted directly between the touch sensor and the force sensor, the force data may still be communicated to the touch sensor exclusively or primarily through the haptic circuit control module.

The force sensor is a component that senses force applied by the user to the touch sensor media and may include a dedicated processor for processing data representing forces the user applies to the touch sensor media. The force sensor may be one or more of a piezoelectric element, resistive element, and strain gauge.

The force sensor may include logs or other memory elements to record force sensor data samples, perhaps collected in force sensor reports. The frequency at which the force sensor updates these reports may be consistent or may differ depending on whether the force sensor is in an active or inactive state. The force sensor may periodically transmit force data reports to the haptic circuit control module.

The force sensor may sample and/or catalog force data at a frequency different from which it transmits force sensor data or reports to the haptic circuit control module. That is, a timing of a report request may not align well with a timing of a force sensor report update. For example, an analog to digital converter of the force sensor may supply force data on a consistent or a dynamic schedule that does not necessarily coincide with timing of requests for force sensor data. In implementations, if the touch sensor receives a touch from the user, the touch sensor may transmit a request to the haptic circuit control module to receive force data. The request may come in the form of an interrupt. The request may come at any time and may come multiple times in an interval where the force sensor has not yet updated data from a prior force sensor report. If the force sensor has not updated the force sensor report, the haptic circuit control module may return the same force sensor report from the prior request. Given one or more of sufficient inactive time, sufficient inactive user interaction, and an instruction from the touch sensor to transition to an inactive force sensor state, the force sensor may be returned to an inactive force sensor state from an active force sensor state.

Implementations are contemplated in which one or more of the haptic circuit control module, the touch sensor, the force sensor, and the haptic response actuator may initiate, generate, store, or maintain user touch states and/or force sensor states. Implementations are also contemplated in which the one or more of the haptic circuit control module, the touch sensor, the force sensor, and the haptic response actuator distribute the control of data transfer, storage, instruction, updating, or other touch sensor media operations or configurations expressed in the implementations of this specification.

The touch sensor can be responsible for determining whether a haptic condition is satisfied and can be responsible for modifying haptic conditions dynamically to account for different situations. In an implementation where the haptic response is a click, a haptic condition may require one or more of an active user touch state, an active force sensor state, and a satisfaction of a haptic condition threshold to satisfy a haptic condition. Other haptic conditions are considered, including ones that depend on prompts from the operating system.

An adjusting operation 506 adjusts electrical power supplied to the haptic response actuator based at least in part on satisfaction of a haptic condition. The haptic power source provides power to the haptic response actuator. The haptic response actuator may rely on the haptic power source to provide sufficient power for a perceivable haptic response. In implementations, the haptic response actuator may include a separate sensor power source to keep the processor of the haptic response actuator active to receive instructions. The adjusting operation 506 may adjust the haptic power source may as a supplemental power source that may provide a power boost. The adjusting operation 506 may also adjust the haptic power source to make haptic responses commensurate with pressure or force applied by a user. The adjusting operation 506 may also adjust the haptic power source based at least in part on the nature of the user interaction, for example, a number of fingers used in a clicking action. The haptic power source may need to be activated quickly to actuate a haptic response, such that a response from the force sensor indicating an extent of an applied force may not be in time to allow the haptic power source to provide a dynamic power supply response. In these instances, a default haptic response resulting from a default power output from the haptic power source may be used.

An actuating operation 508 actuates the haptic response to the touch surface. The haptic response actuated may be based at least in part on one or more of the satisfying of the haptic condition and the supply of adjusted electrical power to the haptic response actuator. The haptic response actuator actuates a haptic response and may include a dedicated haptic response actuator processor. The haptic response actuator may be communicatively coupled to one or more of the touch sensor, the haptic circuit control module, and the haptic power source. In an implementation, the haptic response actuator may receive activation signals from the touch sensor to activate a haptic response. The actuating operation 508 may include a touch sensor transmitting signals representing instructions to a haptic circuit control module to activate and/or adjust haptic power supplied by a haptic power source, and transmitting signals representing different instructions to actuate a haptic response to a haptic response actuator. In an implementation where the haptic response is part of a click, the haptic response may be activated upon applying a threshold pressure (e.g., satisfying a haptic force threshold condition) to the touch sensor media as reflected in force data provided by the force sensor. The haptic response actuator may actuate a second haptic response within the same clicking event upon sufficient pressure (e.g., satisfying a release force threshold condition) having been removed or upon a user releasing the touch sensor media. The haptic response actuator may receive primary power or supplemental power from the haptic power source. Implementations are contemplated in which one or more of the haptic response actuator, the force sensor the touch sensor, and the haptic circuit control module independently or cooperatively determine a magnitude of haptic response, perhaps based at least in part on the magnitude of force of a user touch. Implementations are also contemplated in which haptic responses are generated in response to commands from an operating system of the computing system. For example, interactions with elements of the user interface may cause a haptic response (e.g., pointer proximity to buttons or window edges, application menus). Another example may be disconnecting or connecting to a power source. The haptic responses may also be made in tandem with audio prompts. A touch sensor of the touch sensor media may be responsible for controlling aspects of the haptic responses. For example, the touch sensor may be responsible for determining when a haptic response is triggered, when active user touch states are triggered, when active force states are triggered, when different conditions and/or thresholds should be applied, extents and/or natures of haptic responses, dynamic thresholds for different natures of touch or situations, special thresholding or conditions for haptic responses from prompts from the operating system.

Figure 6:
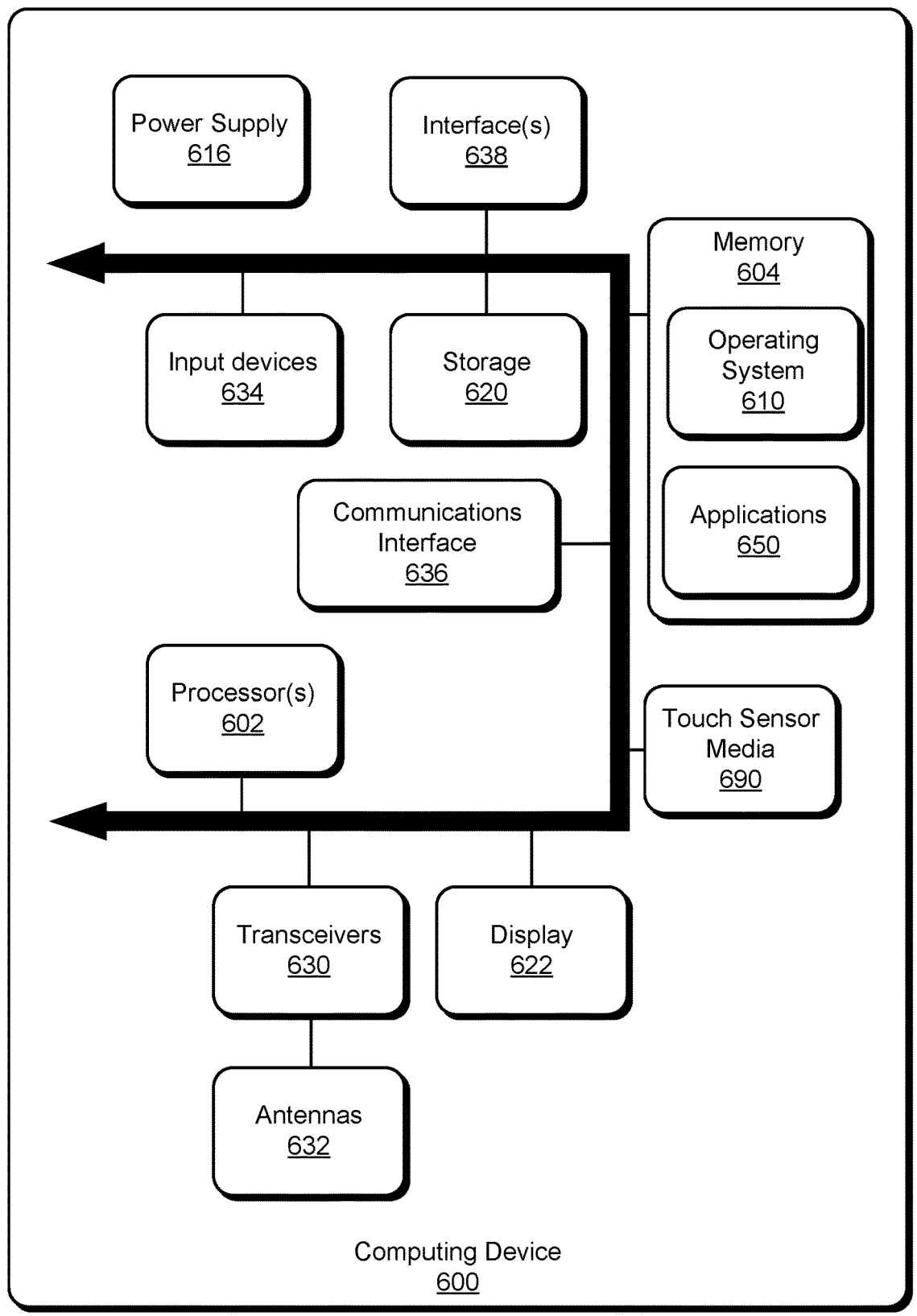
FIG. 6 illustrates an example computing device for implementing the features and operations of the described technology.

FIG. 6 illustrates an example computing device 600 for implementing the features and operations of the described technology. The computing device 600 may embody a remote-control device or a physical controlled device and is an example network-connected and/or network-capable device and can be a client device, such as a laptop, mobile device, desktop, tablet; a server/cloud device; an internet-of-things device; an electronic accessory; or another electronic device. The computing device 600 includes one or more processor(s) 602 and a memory 604. The memory 604 generally includes both volatile memory (e.g., RAM) and nonvolatile memory (e.g., flash memory). An operating system 610 resides in the memory 604 and is executed by the processor(s) 602. In implementations, the operating system 610 may communicate with a haptic circuit control module, for example, to assist or supplement a determination of whether a user touch is meaningful or incidental, to receive and process user indications from touch sensor media 690, to receive a report (e.g., touch reports or force sensor reports), and to receive relevant haptic sensor media data (e.g., user touch states or force sensor states).

In an example computing device 600, as shown in FIG. 6, one or more modules or segments, such as applications 650, a haptic circuit control module, a force sensor, a touch sensor, a haptic response actuator, a haptic power adjuster, a meaningful interaction distinction module, and a haptic power adjustment module are loaded into the operating system 610 on the memory 604 and/or storage 620 and executed by processor(s) 602. The storage 620 may include one or more tangible storage media devices and may store communications, force sensor updates, user indications, data representing sensed touches, data representing natures of user touches, data representing haptic conditions, data representing release conditions, data tables, force sensor data samples, force sensor states, user touch states, force sensor reports, touch sensor reports, interrupts, power adjustment tables, locally and globally unique identifiers, requests, responses, and other data and be local to the computing device 600 or may be remote and communicatively connected to the computing device 600.

The computing device 600 includes a power supply 616, which is powered by one or more batteries or other power sources and which provides power to other components of the computing device 600. The power supply 616 may also be connected to an external power source that overrides or recharges the built-in batteries or other power sources.

The computing device 600 may include one or more communication transceivers 630, which may be connected to one or more antenna(s) 632 to provide network connectivity (e.g., mobile phone network, Wi-Fi®, Bluetooth®) to one or more other servers and/or client devices (e.g., mobile devices, desktop computers, or laptop computers). The computing device 600 may further include a network adapter 636, which is a type of computing device. The computing device 600 may use the adapter and any other types of computing devices for establishing connections over a wide-area network (WAN) or local-area network (LAN). It should be appreciated that the network connections shown are examples and that other computing devices and means for establishing a communications link between the computing device 600 and other devices may be used.

The computing device 600 may include one or more input devices 634 such that a user may enter commands and information (e.g., a keyboard or mouse). These and other input devices may be coupled to the server by one or more interfaces 638, such as a serial port interface, parallel port, or universal serial bus (USB). The computing device 600 may further include a display 622, such as a touch screen display.

The computing device 600 may include touch sensor media 690. Touch sensor media 690 may be an implementation of one or more of touch sensor media 104, 204, 304, and 404. The touch sensor media 690 is a device configured to receive user touch and force data and determine whether user touch states and force sensor states are active or inactive. Based at least in part on the determination, the touch sensor media 690 may determine whether to actuate a haptic response or even whether to supply power to a haptic response actuator.

The computing device 600 may include a variety of tangible processor-readable storage media (e.g., excluding signals per se) and intangible processor-readable communication signals. Tangible processor-readable storage can be embodied by any available media that can be accessed by the computing device 600 and includes both volatile and non-volatile storage media, removable and non-removable storage media. Tangible processor-readable storage media excludes communications signals (e.g., signals per se) and includes volatile and nonvolatile, removable and non-removable storage media implemented in any method or technology for storage of information such as processor-readable instructions, data structures, program modules, or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the computing device 600. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Various software components described herein are executable by one or more processors, which may include logic machines configured to execute hardware or firmware instructions. For example, the processors may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Aspects of processors and storage may be integrated into one or more hardware logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of a remote-control device and/or a physically controlled device implemented to perform a particular function. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service," as used herein, is an application program executable across one or multiple user sessions. A service may be available to one or more system components, programs, and/or other services. In some implementations, a service may run on one or more server computing devices.

The logical operations making up embodiments of the invention described herein may be referred to variously as operations, steps, objects, or modules. Furthermore, it should be understood that logical operations may be performed in any order, adding or omitting operations as desired, regardless of whether operations are labeled or identified as optional, unless explicitly claimed otherwise or a specific order is inherently necessitated by the claim language.

An example method of controlling a haptic response in a device having a touch sensor, a force sensor, and a haptic response actuator operably coupled to a touch surface is provided. The method includes detecting a user touch to the touch surface by the touch sensor, sensing a force applied to the touch surface by the detected user touch, adjusting electrical power supplied to the haptic response actuator based at least in part on the sensed force satisfying a haptic condition, and actuating the haptic response to the touch surface with the haptic response actuated based at least in part on the satisfaction of the haptic condition by the sensed force and the supply of the adjusted electrical power to the haptic response actuator.

Another example method of any preceding method is provided, wherein the operation of adjusting electrical power includes adjusting, by a haptic circuit control module, power supplied by a haptic power source to the haptic response actuator.

Another example method of any preceding method is provided, wherein the operation of actuating the haptic response includes transmitting an actuating signal from the touch sensor to the haptic circuit control module and activating, by the haptic circuit control module, a haptic response power source based at least in part on the transmitted actuating signal and wherein the operation of actuating the haptic response comprises transmitting a different actuating signal from the touch sensor to the haptic response actuator and actuating the haptic response based at least in part on the transmitted different actuating signal.

Another example method of any preceding method is provided, the method including activating a force sensor based at least in part on the detected user touch, wherein the sensing operation is conducted by the activated force sensor.

Another example method of any preceding method is provided, wherein the operation of activating the force sensor includes increasing a frequency of force sense sampling.

Another example method of any preceding method is provided, the method further including adjusting power supplied to actuate the haptic response based at least in part on a magnitude of the sensed force, wherein the power supplied to actuate the haptic response is set to a default value until the operation of adjusting the power supplied to actuate the haptic response.

Another example method of any preceding method is provided, the method further including transmitting a signal representing a user indication to an operating system of the computing device based at least in part on the satisfied haptic condition.

An example computing device including a touch sensor media for controlling a haptic response is provided. The computing device includes a touch sensor to detect a user touch to a touch surface by the touch sensor, a force sensor to sense a force applied to the touch surface by the detected user touch, a haptic response actuator to actuate the haptic response to the touch surface, a haptic circuit control module to adjust electrical power supplied to the haptic response actuator based at least in part on the sensed force satisfying a haptic condition, wherein the haptic response actuator actuates the haptic response based at least in part on satisfaction of the haptic condition by the sensed force and the supply of adjusted electrical power to the haptic response actuator.

Another example computing device of any preceding device is provided, further including a dedicated haptic power source, wherein the haptic power circuit control module adjusts electrical power by adjusting electrical power output of the dedicated haptic power source to the haptic response actuator.

Another example computing device of any preceding device is provided, wherein the haptic response actuator actuates the haptic response responsive to the touch sensor transmitting an actuating signal to the haptic circuit control module and the haptic circuit control module activating a haptic response power source based at least in part on the transmitted actuating signal and responsive to the touch sensor transmitting a different actuating signal to the haptic response actuator, wherein the actuating the haptic response is based at least in part on the transmitted different actuating signal.

Another example computing device of any preceding device is provided, wherein the force sensor is configured to activate based at least in part on the detected user touch.

Another example computing device of any preceding device is provided, wherein activation of the force sensor includes increasing a frequency of force sense sampling Another example computing device of any preceding device is provided, wherein the haptic circuit control module is operable to adjust the electrical power supplied to actuate the haptic response based at least in part on a magnitude of the sensed force, wherein the electrical power supplied to actuate the haptic response is set to a default value until the haptic circuit control module adjusts the electrical power supplied to actuate the haptic response.

Another example computing device of any preceding device is provided, further including a transmitter to transmit a signal representing a user indication to an operating system of the device based at least in part on the satisfied haptic condition.

One or more example tangible processor-readable storage media devices encoding processor-executable instructions for executing on an electronic computing device including a touch sensor, a force sensor, and a haptic response actuator operably coupled to a touch surface a process of managing data is provided. The process includes detecting a user touch to the touch surface by the touch sensor, sensing a force applied to the touch surface by the detected user touch, adjusting electrical power supplied to the haptic response actuator based at least in part on the sensed force satisfying a haptic condition, and actuating the haptic response to the touch surface with the haptic response actuated based at least in part on the satisfaction of the haptic condition by the sensed force and the supply of the adjusted electrical power to the haptic response actuator.

One or more other example tangible processor-readable storage media of any preceding media is provided, wherein the operation of adjusting electrical power includes adjusting, by a haptic circuit control module, power supplied by a haptic power source to the haptic response actuator.

One or more other example tangible processor-readable storage media of any preceding media is provided, wherein the operation of actuating the haptic response includes transmitting an actuating signal from the touch sensor to the haptic circuit control module and activating, by the haptic circuit control module, a haptic response power source based at least in part on the transmitted actuating signal and wherein the operation of actuating the haptic response includes transmitting a different actuating signal from the touch sensor to the haptic response actuator and actuating the haptic response based at least in part on the transmitted different actuating signal.

One or more other example tangible processor-readable storage media of any preceding media is provided, the process further including activating a force sensor based at least in part on the detected user touch, wherein the sensing operation is conducted by the activated force sensor.

One or more other example tangible processor-readable storage media of any preceding media is provided, the process further including adjusting power supplied to actuate the haptic response based at least in part on a magnitude of the sensed force, wherein the power supplied to actuate the haptic response is set to a default value until the operation of adjusting the power supplied to actuate the haptic response.

One or more other example tangible processor-readable storage media of any preceding media is provided, the process further including transmitting a signal representing a click to an operating system of the device based at least in part on the satisfied haptic condition.

An example system of controlling a haptic response in a device having a touch sensor, a force sensor, and a haptic response actuator operably coupled to a touch surface is provided. The system includes means for detecting a user touch to the touch surface by the touch sensor, means for sensing a force applied to the touch surface by the detected user touch, means for adjusting electrical power supplied to the haptic response actuator based at least in part on the satisfaction of a haptic condition by the sensed force, and means for actuating the haptic response to the touch surface with the haptic response actuated based at least in part on the satisfaction of the haptic condition by the sensed force and the supply of the adjusted electrical power to the haptic response actuator.

Another example system of any preceding system is provided, wherein the adjustment includes a haptic circuit control module adjusting power supplied by a haptic power source to the haptic response actuator.

Another example system of any preceding system is provided, wherein the haptic response actuator further including means for transmitting an actuating signal from the touch sensor to the haptic circuit control module and means for activating, by the haptic circuit control module, a haptic response power source based at least in part on the transmitted actuating signal and wherein the haptic response actuator actuates the haptic response using means for transmitting a different actuating signal from the touch sensor to the haptic response actuator and means for actuating the haptic response based at least in part on the transmitted different actuating signal.

Another example system of any preceding system is provided, the system including means for activating a force sensor based at least in part on the detected user touch, wherein the force sensor causes the sensing.

Another example system of any preceding system is provided, wherein the force sensor is activated by increasing a frequency of force sense sampling.

Another example system of any preceding system is provided, the system further including means for adjusting power supplied to actuate the haptic response based at least in part on a magnitude of the sensed force, wherein the power supplied to actuate the haptic response is set to a default value until the adjustment of the power supplied to actuate the haptic response.

Another example system of any preceding system is provided, the system further including means for transmitting a signal representing a user indication to an operating system of the computing device based at least in part on the satisfied haptic condition.

While this specification contains many specific implementation details, these should not be construed as limitations on the scope of any inventions or of what may be claimed, but rather as descriptions of features specific to particular implementations of the particular described technology. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated into a single software product or packaged into multiple products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Implementations of the described technology have been described. Nevertheless, it will be understood that various modifications can be made without departing from the spirit and scope of the recited claims.

What is claimed is:

1. A method of controlling a haptic response in a device having a touch sensor, a force sensor, and a haptic response actuator operably coupled to a touch surface, comprising:
   detecting a user touch to the touch surface by the touch sensor;
   sensing a force applied to the touch surface by the detected user touch;
   adjusting electrical power supplied to the haptic response actuator, the haptic response actuator including a dedicated haptic response actuator processor, the adjusting the electrical power supplied based at least in part on the sensed force satisfying a haptic condition; and
   actuating the haptic response to the touch surface with the haptic response actuated based at least in part on the satisfaction of the haptic condition by the sensed force and the supply of the adjusted electrical power to the haptic response actuator.

2. The method of claim 1, wherein the operation of adjusting electrical power comprises adjusting, by a haptic circuit control module, power supplied by a haptic power source to the haptic response actuator.

3. The method of claim 2, wherein the operation of actuating the haptic response comprises transmitting an actuating signal from the touch sensor to the haptic circuit control module and activating, by the haptic circuit control module, a haptic response power source based at least in part on the transmitted actuating signal, and
   wherein the operation of actuating the haptic response comprises transmitting a different actuating signal from the touch sensor to the haptic response actuator and actuating the haptic response based at least in part on the transmitted different actuating signal.

4. The method of claim 1, further comprising:
   activating a force sensor based at least in part on the detected user touch, wherein the sensing operation is conducted by the activated force sensor.

5. The method of claim 4, wherein the operation of activating the force sensor comprises increasing a frequency of force sense sampling.

6. The method of claim 1, further comprising:
adjusting the electrical power supplied to actuate the haptic response based at least in part on a magnitude of the sensed force, wherein the electrical power supplied to actuate the haptic response is set to a default value until the operation of adjusting the electrical power supplied to actuate the haptic response.

7. The method of claim 1, further comprising:
transmitting a signal representing a user indication to an operating system of the device based at least in part on the satisfied haptic condition.

8. A computing device including a touch sensor media for controlling a haptic response, comprising:
a touch sensor to detect a user touch to a touch surface by the touch sensor;
a force sensor to sense a force applied to the touch surface by the detected user touch;
a haptic response actuator to actuate the haptic response to the touch surface, the haptic response actuator including a dedicated haptic response actuator processor;
a haptic circuit control module to adjust electrical power supplied to the haptic response actuator based at least in part on the sensed force satisfying a haptic condition, wherein the haptic response actuator actuates the haptic response based at least in part on satisfaction of the haptic condition by the sensed force and the supply of adjusted electrical power to the haptic response actuator.

9. The computing device of claim 8, further comprising a dedicated haptic power source, wherein the haptic circuit control module adjusts the electrical power by adjusting electrical power output of the dedicated haptic power source to the haptic response actuator.

10. The computing device of claim 9, wherein the haptic response actuator actuates the haptic response responsive to the touch sensor transmitting an actuating signal to the haptic circuit control module and the haptic circuit control module activating a haptic response power source based at least in part on the transmitted actuating signal and responsive to the touch sensor transmitting a different actuating signal to the haptic response actuator, wherein the actuating the haptic response is based at least in part on the transmitted different actuating signal.

11. The computing device of claim 10, wherein the force sensor is configured to activate based at least in part on the detected user touch.

12. The computing device of claim 11, wherein the activation of the force sensor includes increasing a frequency of force sense sampling.

13. The computing device of claim 8, wherein the haptic circuit control module is operable to adjust the electrical power supplied to actuate the haptic response based at least in part on a magnitude of the sensed force, wherein the electrical power supplied to actuate the haptic response is set to a default value until the haptic circuit control module adjusts the electrical power supplied to actuate the haptic response.

14. The computing device of claim 8, further comprising:
a transmitter to transmit a signal representing a user indication to an operating system of the computing device based at least in part on the satisfied haptic condition.

15. One or more tangible processor-readable storage media devices encoding processor-executable instructions for executing on an electronic computing device including a touch sensor, a force sensor, and a haptic response actuator operably coupled to a touch surface a process of managing data, the process comprising:
detecting a user touch to the touch surface by the touch sensor;
sensing a force applied to the touch surface by the detected user touch;
adjusting electrical power supplied to the haptic response actuator, the haptic response actuator including a dedicated haptic response actuator processor, the adjusting the electrical power supplied based at least in part on the sensed force satisfying a haptic condition; and
actuating the haptic response to the touch surface with the haptic response actuated based at least in part on the satisfaction of the haptic condition by the sensed force and the supply of the adjusted electrical power to the haptic response actuator.

16. The one or more tangible processor-readable storage media devices of claim 15, wherein the operation of adjusting electrical power comprises adjusting, by a haptic circuit control module, power supplied by a haptic power source to the haptic response actuator.

17. The one or more tangible processor-readable storage media devices of claim 16, wherein the operation of actuating the haptic response comprises transmitting an actuating signal from the touch sensor to the haptic circuit control module and activating, by the haptic circuit control module, a haptic response power source based at least in part on the transmitted actuating signal, and
wherein the operation of actuating the haptic response comprises transmitting a different actuating signal from the touch sensor to the haptic response actuator and actuating the haptic response based at least in part on the transmitted different actuating signal.

18. The one or more tangible processor-readable storage media devices of claim 15, the process further comprising:
activating a force sensor based at least in part on the detected user touch, wherein the sensing operation is conducted by the activated force sensor.

19. The one or more tangible processor-readable storage media devices of claim 15, the process further comprising:
adjusting the electrical power supplied to actuate the haptic response based at least in part on a magnitude of the sensed force, wherein the electrical power supplied to actuate the haptic response is set to a default value until the operation of adjusting the electrical power supplied to actuate the haptic response.

20. The one or more tangible processor-readable storage media devices of claim 15, the process further comprising:
transmitting a signal representing a click to an operating system of the computing device based at least in part on the satisfied haptic condition.

* * * * *